July 11, 1939.     H. A. LILEY     2,165,897
ACCELERATOR CONTROL FOR MOTOR VEHICLES
Filed May 23, 1938
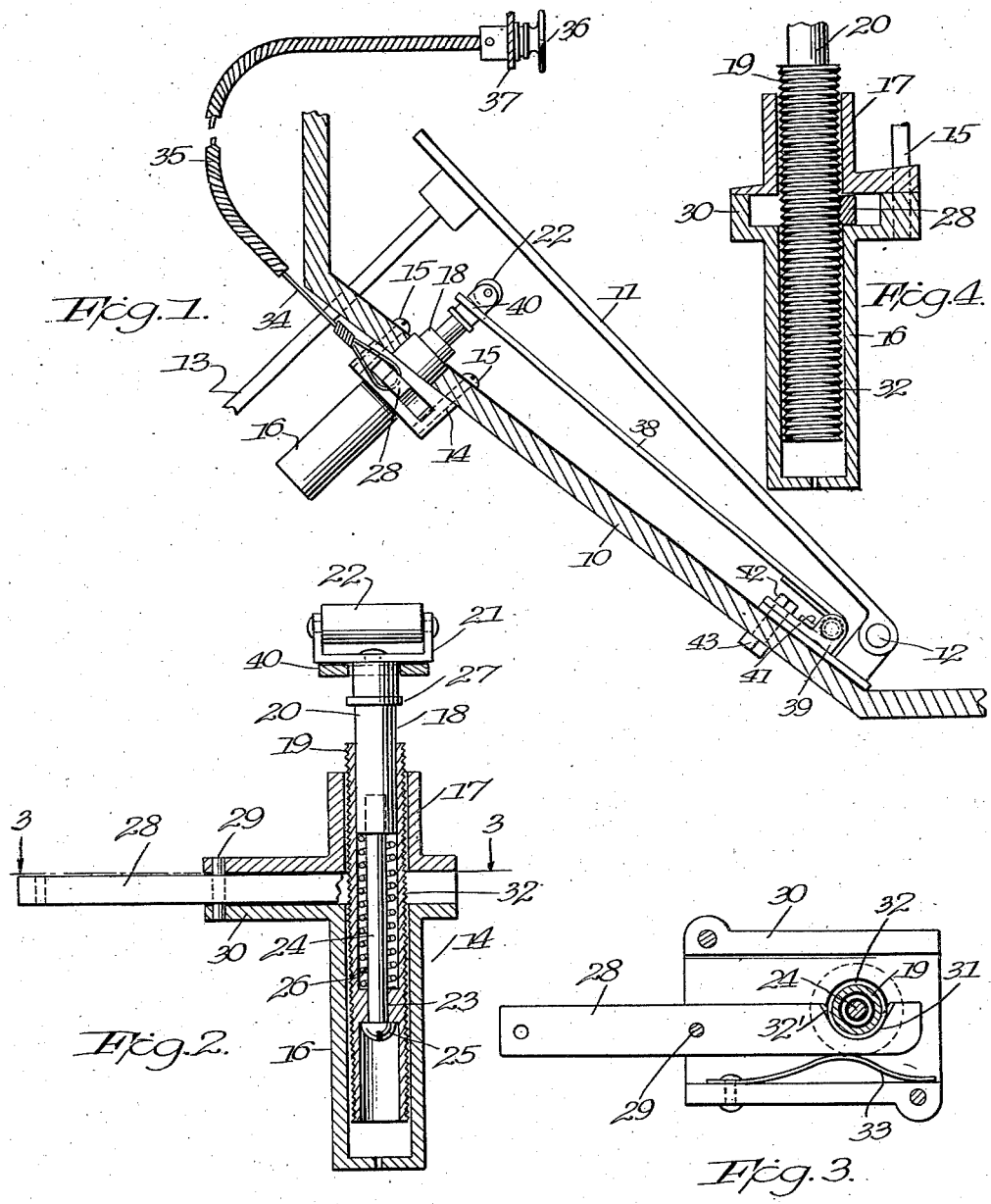
Inventor
Harold A. Liley
By Cushman Darby & Cushman
Attorney Patented July 11, 1939

2,165,897

UNITED STATES PATENT OFFICE 2,165,897

ACCELERATOR CONTROL FOR MOTOR VEHICLES

Harold A. Liley, Detroit, Mich.

Application May 23, 1938, Serial No. 209,621

11 Claims. (Cl. 74—526)

The present invention relates to an accelerator control for motor vehicles.

An object of the invention is the provision of an accelerator control mechanism adapted to be associated with the usual accelerator pedal of a motor vehicle to limit the depression of the accelerator and thereby control the speed of the vehicle.

A further object is to provide an accelerator control mechanism, which may be adjusted relative to the foot accelerator whereby the maximum speed of the vehicle may be varied as desired. The present invention is particularly useful during long trips, since the driver, after setting the control mechanism, may depress the accelerator to the desired maximum limit, and thereafter maintain the accelerator in this position without the necessity of constantly shifting the position of the accelerator. While the invention is primarily designed for use in semi-flat country, means are provided to permit the accelerator to be depressed an additional amount after contact with the control mechanism, in the event it becomes necessary to momentarily increase the speed, such as when ascending a hill.

A still further object provides a quick release of the control mechanism to render the same inoperative in case of an emergency, or where it is desired to operate the accelerator in the usual manner. Means are also employed to allow the control mechanism to be easily reset during operation of the vehicle, by merely depressing the accelerator to the desired position and then releasably locking it in this position.

With the foregoing and other objects in view, the invention will now be more fully described, reference being had to the accompanying drawing, in which:

Figure 1 is a section through the floor board of a motor vehicle showing the usual accelerator pedal and my control mechanism in operative position with respect to the accelerator.

Figure 2 is an enlarged front view, partly in section, of the stop member locked in operative position.

Figure 3 is a section on line 3—3 of Figure 2, and

Figure 4 is a fragmentary side view of the stop member.

Referring now to the drawing, the numeral 10 designates the usual inclined floor board of a motor vehicle to which is hinged the usual foot accelerator 11 in the customary manner, as at 12. A rod 13 is connected to the free end of the accelerator and passes through the floor board where it connects in any desired manner to the throttle valve of the motor vehicle (not shown).

Referring to Figure 1, the accelerator control mechanism of the present invention is shown in operative position with respect to the foot accelerator or pedal 11. This control mechanism comprises a housing 14 secured to the under side of the floor board 10 by any suitable means, such as the fastening elements 15. The housing 14 is provided with a substantially circular well 16, the greater portion of which is located below the floor board 10. The upper portion of the housing 14 constitutes a collar 17 projecting through the floor board in alignment with the foot accelerator 11.

A stop member 18 is supported in the well 16 and is capable of longitudinal adjustment therein, as will be hereinafter described in detail. The stop member 18 comprises a tubular cylinder or casing 19 and a plunger 20 longitudinally movable in the cylinder. To the upper end of the plunger 20 is secured a U-shaped bracket or yoke 21 within which is journaled a roller 22 positioned directly under the foot accelerator 11 and constituting a stop for limiting the downward movement of the accelerator.

With the construction as thus far described, and assuming that the stop member 18 has been locked in the desired position in the housing 14, the foot accelerator 11 may be depressed in the usual manner until it contacts the roller 22. Under ordinary conditions, when the accelerator is resting on the roller 22, the motor vehicle will be operating at its desired maximum speed, and assuming that it is desired to maintain this speed for a considerable period of time, it is merely necessary for the operator to maintain the accelerator in this fixed position without necessitating constant change or movement of the accelerator as is customary in the usual operation of a motor vehicle.

Under some circumstances, such as ascending a hill or in the case of an emergency, it may be necessary to quickly increase the speed of the vehicle over the desired maximum to which the control mechanism has been set. This exigency is taken care of by constructing the stop member so that the plunger 20 may be moved with respect to the casing or cylinder 19 by a pronounced increase in pressure on the foot accelerator. That is, after the accelerator 11 has contacted the roller 22, the plunger 20 and the accelerator 11 may be moved downwardly an additional predetermined distance by increasing the pressure of the foot upon the accelerator 11. This is accomplished by providing the cylinder 19 with a centrally apertured web 23 adjacent its lower end. The plunger 20 may either have its lower end reduced in diameter or be provided with a pin 24 extending through the apertured web 23. This pin has a head 25 which is normally maintained in contact with the web 23 by means of a coil spring 26. In this manner, the coil spring will normally urge the plunger 20 and roller 22 into their extreme raised positions. It is to be understood that the coil spring 26 is of sufficient strength to normally maintain the plunger in its raised position even under the slight pressure exerted by the accelerator pedal when it is depressed into contact with the roller 22 by the operator's foot. In other words, the plunger 20 is adapted to be maintained in the position shown in Figure 2, even after the accelerator 11 has come in contact with the same and is held in contacting relation therewith by normal foot pressure of the operator. However, when the foot pressure is substantially increased on the accelerator 11, the plunger 20 will be moved downwardly against the tension of the spring 26 until the shoulder 27 on the plunger engages the upper end of the cylinder or casing 19. This additional distance to which the plunger 20 may be depressed is adapted to increase the speed of the vehicle sufficiently to take care of any emergency which might necessitate a rapid or increased acceleration of the vehicle. Just as soon as the increased foot pressure is relieved on the accelerator, the spring 26 will return the plunger 20 to its raised position where it will again function as a stop for normally limiting the downward movement of the foot accelerator.

In the event that it is desired to operate the foot accelerator 11 in the usual manner without use of the control mechanism, means are provided whereby this mechanism may be easily and quickly rendered inoperative. This means comprises a locking lever 28 which is pivotally connected, as at 29, upon a lateral extension 30 of the housing 14 (see Figures 2 and 3). The lever 28 is provided with a substantially semi-circular notch or recess 31 adjacent its inner end which registers with and is adapted to embrace the cylinder or casing 19. The outer face of the cylinder is provided with threads 32 throughout substantially the entire length of the cylinder and these are adapted to cooperate with like threads 32' formed in the wall of the recess 31, to positively lock the stop member in various positions of adjustment with respect to the accelerator 11. A leaf spring 33 is mounted within the lateral portion 30 of the housing and normally urges the recessed portion 31 into engagement with the cylinder 19. The outer end of the lever 28 is preferably connected to one end of a flexible wire 34 (see Figure 1). This wire extends through a flexible casing 35 and has its other end secured to a hand pull or button 36, preferably mounted on the dash 37 of the motor vehicle.

With this construction, when it is desired to render the control mechanism inoperative, it is merely necessary to pull out on the button 36, which will have the effect of swinging the lever 28 about its pivot 29 against the tension of the spring 33. This will release the lever 28 from the cylinder 19 of the stop member and thereby permit uncontrolled operation of the accelerator. With the release of the stop member, it would ordinarily drop to the bottom of the well 16 of the housing. Means are provided, however, to raise the stop member and maintain it under slight spring pressure against the under side of the foot accelerator, immediately upon release by the lever 28. This means comprises a plate 38 which is hinged to a bracket 39 secured to the floor board 10. The free end of the hinged plate 38 is bifurcated to provide a pair of tongues or fingers 40 which embrace the plunger 20 and are normally urged into contact with the under side of the bracket 21 by means of a spring 41 secured to the bracket 39. Referring to Figure 1, it will be observed that the bracket 39 is superimposed upon the bracket 12 of the foot accelerator and that a common fastening element is employed to secure both brackets to the floor board 10. I have illustrated this fastening means as a bolt 42 passing through aligned openings in the bracket and floor board, and a nut 43 threaded on the end of the nut beneath the floor board. However, any other suitable fastening means may be provided as desired.

It will be apparent that as soon as the locking lever 28 releases the stop member 18, the spring 41 will raise the latter and urge it into engagement with the under side of the foot accelerator 11. It is to be understood that the locking lever 28 may be released, not only when it is desired to operate the foot accelerator independently of the control mechanism, but also when it is desired to reset the stop member to effect a change in the maximum speed limit of the vehicle. When it is desired to reset the stop member, and assuming that the locking lever 28 is still in released position, it is merely necessary to depress the foot accelerator and stop member against the tension of the spring 41 until the desired position of adjustment has been attained. With the accelerator maintained in this position by the foot of the operator, the handle 36 may be released, whereupon the spring 33 will move the lever 28 into locking engagement with the cylinder 19.

It will be observed that when the foot accelerator has been depressed to the point where it contacts with the roller 22, any further downward movement of the foot accelerator will be against the combined tension of springs 26 and 41. Thus, while the stop member may be depressed by the accelerator pedal to provide an increase in speed, it will be appreciated that the necessary pressure to produce this further depression of the accelerator will be quite pronounced. That is, the pressure necessary to move the accelerator into contact with the roller 22 will be considerably less than that necessary to move the stop member to the point where the collar 27 engages the upper end of the cylinder 19. It is to be understood, however, that while this additional pressure is considerably greater than that required to move the accelerator to the roller 22, it is not sufficient to cause any great exertion or inconvenience on the part of the operator when it is necessary to quickly accelerate the speed of the vehicle. It is to be further understood that, while the present invention may be used without the roller 22, the latter constitutes one of the preferred elements of this construction. Without the roller, there would be a tendency for the foot accelerator to bind on the top of the plunger 20 when foot pressure is applied to the accelerator. This objectionable feature is, however, eliminated by use of the roller 22 since the foot accelerator, after it comes into contact with the roller, will ride on the latter when the plunger is depressed. Furthermore, such variations from the construction herein shown and described, as are within the skill of a mechanic, may, of course, be made without departing from the range of my invention.

I claim:—

1. A foot accelerator control device comprising a stop member normally positioned in the path of movement of but out of control with the accelerator and adapted to engage the latter when the accelerator is depressed a predetermined amount, means associated with said stop member for allowing the accelerator to be depressed an additional predetermined amount after its engagement with said stop member, and means for rendering said stop member inoperative.

2. A foot accelerator control device comprising a stop member adapted to be positioned in the path of movement of the accelerator and adapted to engage the latter when the accelerator is depressed a predetermined amount, means associated with said stop member for allowing the accelerator to be depressed an additional predetermined amount after its engagement with said stop member, means for adjustably locking the stop member in operative position with respect to the accelerator, and means for releasing the locking means to render the stop member inoperative.

3. A foot accelerator control device for motor vehicles comprising a stop member including a casing, a plunger movably mounted in the casing and having a portion thereof projecting upwardly from the casing, a roller mounted on the upper end of said plunger exteriorly of said casing and located in the path of movement of the accelerator and adapted to engage the latter when the accelerator is depressed a predetermined amount to supply fuel to the vehicle, and means associated with said casing and plunger for allowing the latter to be moved within certain limits within the casing by the accelerator, whereby the accelerator is capable of further depression after engagement with the roller to increase the supply of fuel.

4. A foot accelerator control device comprising a stop member including a casing, a plunger movably mounted in the casing and having a portion thereof projecting from the casing in the path of movement of the accelerator and adapted to engage the latter when the accelerator is depressed a predetermined amount, said casing having an interior apertured web, said plunger having a reduced portion extending through the apertured web and having a head on its free end, and a coil spring surrounding the reduced portion of the plunger and normally maintaining the head against the web, whereby further depression of the accelerator is permitted after engagement of the latter with the plunger.

5. A foot accelerator control device comprising a stop member adapted to be positioned in the path of movement of the accelerator and adapted to engage the latter when the accelerator is depressed a predetermined amount, a housing within which the stop member is movably mounted, means for adjustably locking the stop member in the housing whereby said member may be adjusted relative to the accelerator to limit actuation thereof, and means for rendering the locking means inoperative.

6. A foot accelerator control device comprising a stop member adapted to be positioned in the path of movement of the accelerator and adapted to engage the latter when the accelerator is depressed a predetermined amount, a housing within which the stop member is movably mounted, means for adjustably locking the stop member in the housing, and means adapted to urge the stop member into engagement with the accelerator when the locking means is rendered inoperative.

7. A foot accelerator control device comprising a stop member adapted to be positioned in the path of movement of the accelerator and adapted to engage the latter when the accelerator is depressed a predetermined amount, a housing within which the stop member is adjustably mounted, a locking lever pivotally mounted in the housing and having a recessed portion engageable with the stop member for maintaining the latter in different positions of adjustment, a spring carried by the housing for normally urging the lever into engagement with the stop member, said locking lever having a portion thereof projecting exteriorly of the housing, and means connected with said lever for moving it to inoperative position against the tension of said spring.

8. In combination, a foot accelerator mounted on the foot board of a motor vehicle, a stop member mounted on the foot board beneath the accelerator and engageable with the accelerator when the latter is depressed a predetermined amount, means for locking the stop member in different positions of adjustment relative to the accelerator, means for rendering the locking means inoperative, and means for moving the stop member into engagement with the accelerator when the locking means is rendered inoperative.

9. In combination, a foot accelerator pivotally mounted on the foot board of a motor vehicle, a stop member mounted on the foot board beneath the accelerator and engageable with the accelerator when the latter is depressed a predetermined amount, means for locking the stop member in different positions of adjustment relative to the accelerator, means for rendering the locking means inoperative, and a spring actuated plate mounted on the foot board and engageable with the stop member to move the latter into engagement with the accelerator when the locking means is rendered inoperative.

10. In combination, a foot accelerator pivotally mounted on the foot board of a motor vehicle, a stop member mounted on the foot board beneath the accelerator and engageable with the accelerator when the latter is depressed a predetermined amount, means for locking the stop member in different positions of adjustment relative to the accelerator, means for rendering the locking means inoperative, and a spring actuated plate pivotally mounted on the floor board beneath the accelerator and having its free end engageable with the stop member to urge the latter into engagement with the accelerator when the locking means is rendered inoperative.

11. In combination, an elongated foot accelerator having one end thereof pivotally mounted on the foot board of a motor vehicle, a stop member including a casing mounted on the foot board and a plunger movably mounted in the casing, said casing and plunger being entirely within the confines of the foot accelerator, and the plunger having a portion thereof projecting upwardly beneath the accelerator, and means associated with said casing and plunger for allowing the latter to be moved within certain limits within the casing by the accelerator, whereby the accelerator is capable of further depression after engagement with the plunger to increase the supply of fuel.

HAROLD A. LILEY.